United States Patent [19]
Gee et al.

[11] Patent Number: 6,054,415
[45] Date of Patent: Apr. 25, 2000

[54] SKELETALLY ISOMERIZED LINEAR OLEFINS

[75] Inventors: Jeffrey C. Gee, Kingwood, Tex.; Roger C. Williamson, Lewes, Del.; Christophe J. Lawrie, Kingwood, Tex.; Stephen J. Miller, San Francisco, Calif.

[73] Assignee: Chevron Chemical Company LLC, San Francisco, Pa.

[21] Appl. No.: 08/921,634

[22] Filed: Aug. 27, 1997

Related U.S. Application Data

[60] Continuation of application No. 08/716,119, Sep. 19, 1996, Pat. No. 5,741,759, which is a division of application No. 08/381,039, Jan. 31, 1995, abandoned, which is a continuation-in-part of application No. 08/190,404, Feb. 2, 1994, abandoned.

[51] Int. Cl.[7] ............................. C07C 5/23; C07C 5/22; C09K 7/00
[52] U.S. Cl. ........................ 507/103; 585/666; 585/667; 585/671
[58] Field of Search ............................. 507/103; 585/666, 585/667, 671

[56] References Cited

U.S. PATENT DOCUMENTS

| | | |
|---|---|---|
| 3,607,968 | 9/1971 | Schenk et al. ..................... 585/671 |
| 4,108,889 | 8/1978 | Connor ............................. 260/502.4 R |
| 4,620,053 | 10/1986 | Welch ..................................... 585/666 |
| 5,043,524 | 8/1991 | Ryan ...................................... 585/666 |
| 5,082,986 | 1/1992 | Miller .................................... 585/667 |
| 5,087,793 | 2/1992 | Akiyama et al. ...................... 585/666 |
| 5,107,050 | 4/1992 | Gaffney et al. ....................... 585/671 |
| 5,114,563 | 5/1992 | Lok et al. .............................. 585/671 |
| 5,227,569 | 7/1993 | O'Young et al. ..................... 585/671 |
| 5,463,161 | 10/1995 | Gadja et al. .......................... 585/671 |
| 5,817,907 | 10/1998 | Benazzi et al. ....................... 585/671 |
| 5,874,661 | 2/1999 | Verrelst et al. ....................... 585/671 |

*Primary Examiner*—Philip Tucker
*Attorney, Agent, or Firm*—W. Bradley Haymond; James W. Ambrosius

[57] ABSTRACT

The present invention relates to synthetic hydrocarbons produced by skeletal isomerization, and the isomerization process. The products are especially useful as the continuous phase of a drilling fluid, for example when prepared from $C_{14}$ to $C_{18}$ linear alpha-olefins via isomerization or hydroisomerization, and as lube oils.

The present invention also relates to a process for producing synthetic hydrocarbons by skeletally isomerizing $C_{12+}$ olefins over a catalyst comprising an intermediate pore size molecular sieve, with or without Group VIII metals under skeletal isomerization conditions which result in little, preferably in substantially no, olefin cracking or oligomerization.

16 Claims, 1 Drawing Sheet

Figure

SKELETALLY ISOMERIZED LINEAR OLEFINS

CROSS-REFERENCE TO RELATED APPLICATIONS

This application is a continuation of U.S. Ser. No. 08/716,119 filed Sep. 19,1996 now U.S. Pat. No. 5,741,759 which in turn is a divisional of U.S. Ser. No. 08/381,039 filed Jan. 31,1995, now abandoned, which in turn is a continuation-in-part of U.S. Ser. No. 08/190,404 filed Feb. 2, 1994, now abandoned.

BACKGROUND OF THE INVENTION

This invention relates to skeletally isomerized linear olefins and novel processes for preparing these olefins. The invention also relates to the use of these olefins for drilling fluids for subterranean oil and gas wells, other drilling fluid applications and drilling procedures, and for lube oils. The invention particularly relates to synthetic hydrocarbon mixtures prepared from $C_{14}$ to $C_{18}$ normal alpha-olefins via skeletal isomerization. These synthetic hydrocarbons exhibit minimal toxicity toward aquatic life and possess desirable rheological and filtration control properties for use in drilling fluids.

The use of synthetic hydrocarbons, particularly oligomerized olefins, for drilling fluids has recently been patented. For example, Mercer et al. in U.S. Pat. No. 5,096,883 disclose the use of compositions consisting essentially of branched paraffins having between 16 and 40 carbon atoms per molecule (such as the hydrogenated dimer of 1-decene) for this use. Also, Patel et al. in U.S. Pat. No. 5,189,012 disclose the use of compositions comprising branched chain oligomers having an average molecular weight of from 120 to 1000 in drilling fluids. These synthetic hydrocarbons are prepared by oligomerizing one or more olefinic monomers having a chain length of $C_2$ to $C_{14}$. The full disclosure of these two references is incorporated herein by reference.

Methods of making the olefin oligomers of Mercer and Patel are well known. One commercial oligomerization method utilizes a boron trifluoride catalyst. However, boron trifluoride is toxic and, upon contact with water or steam, produces toxic and corrosive fumes. Moreover, disposal of boron trifluoride residues presents an environmental problem. Therefore, a novel process to produce synthetic hydrocarbons useful for drilling fluids from non-hazardous reagents utilizing a non-hazardous, non-polluting catalyst would be a significant improvement in the art.

Additionally, only a small fraction of the commercially available products of olefin oligomerization are useful in drilling fluids. Thus, the synthetic hydrocarbons used in the above-mentioned patents are often in short supply and not readily available.

The long-felt need described in these patents for an environmentally acceptable, fully functional, and readily available synthetic hydrocarbon for use in synthetic hydrocarbon-based drilling fluids has not yet been satisfied; that is, not until the invention described hereinbelow.

SUMMARY OF THE INVENTION

In one embodiment, the present invention is a component of a downhole fluid used in subterranean wells comprising a skeletally isomerized linear olefins mixture, where the olefins have at least 12 carbon atoms. This component is especially useful in drilling fluids, for example, as the continuous phase of a synthetic hydrocarbon-based drilling fluid. An especially preferred composition is prepared from one or more normal alpha-olefins (NAO's) having between 14 and 18 carbon atoms.

In another embodiment, the present invention is an invert emulsion drilling fluid which includes a mixture of isomerized linear olefins as the continuous phase, a weight material, and water. Optionally, the drilling fluid can contain emulsifiers, viscosifiers, fluid-loss additives, and other specific additives designed to impart desirable properties to the fluid.

In yet another embodiment, the present invention is a process for producing synthetic hydrocarbons by skeletally isomerizing linear olefins over a catalyst comprising a molecular sieve. Preferred molecular sieves are intermediate pore-size silicoaluminophosphates, preferably SAPO-11. The sieves can contain at least one Group VIII metal, or can be free of these metals. These synthetic hydrocarbons are useful in oil field applications, for example as the continuous phase of synthetic hydrocarbon-based drilling fluids, and as lubricating (lube) oils.

Among other factors, the present invention is based on the unexpected discovery that, although normal alpha-olefins are not generally useful in synthetic hydrocarbon-based drilling fluids, these and other linear olefins can be partially skeletally isomerized to produce minimally toxic synthetic hydrocarbons that are highly effective in downhole applications, especially as the continuous phase of drilling fluids.

Additionally, we have unexpectedly found that skeletal isomerization can be accomplished at relatively mild conditions. For example, $C_{16-18}$ olefins can be isomerized at temperatures of about 150° C. and in the absence of added hydrogen. At these mild conditions, the degree of isomerization is sufficient to meet required product properties while minimizing hydrocarbon cracking and oligomerization. Indeed, the mild isomerization conditions result in little, preferably in substantially no, olefin cracking. In fact, synthetic hydrocarbons can be produced that meet drilling fluid specifications at yields approaching 100%. The mild isomerization conditions also result in low energy consumption. Moreover, the novel isomerization processes of this invention are simple and easy to run.

Additionally, and quite surprisingly, we have found that molecular sieves, especially silicoaluminophosphates, are highly effective skeletal isomerization catalysts, even in the absence of transition or noble metals, including the platinum (Pt) group metals.

One particular advantage of this process is that the properties of the synthetic hydrocarbons can be easily controlled by choice of olefin feed and isomerization process conditions.

DETAILED DESCRIPTION OF THE INVENTION

Figure 1:
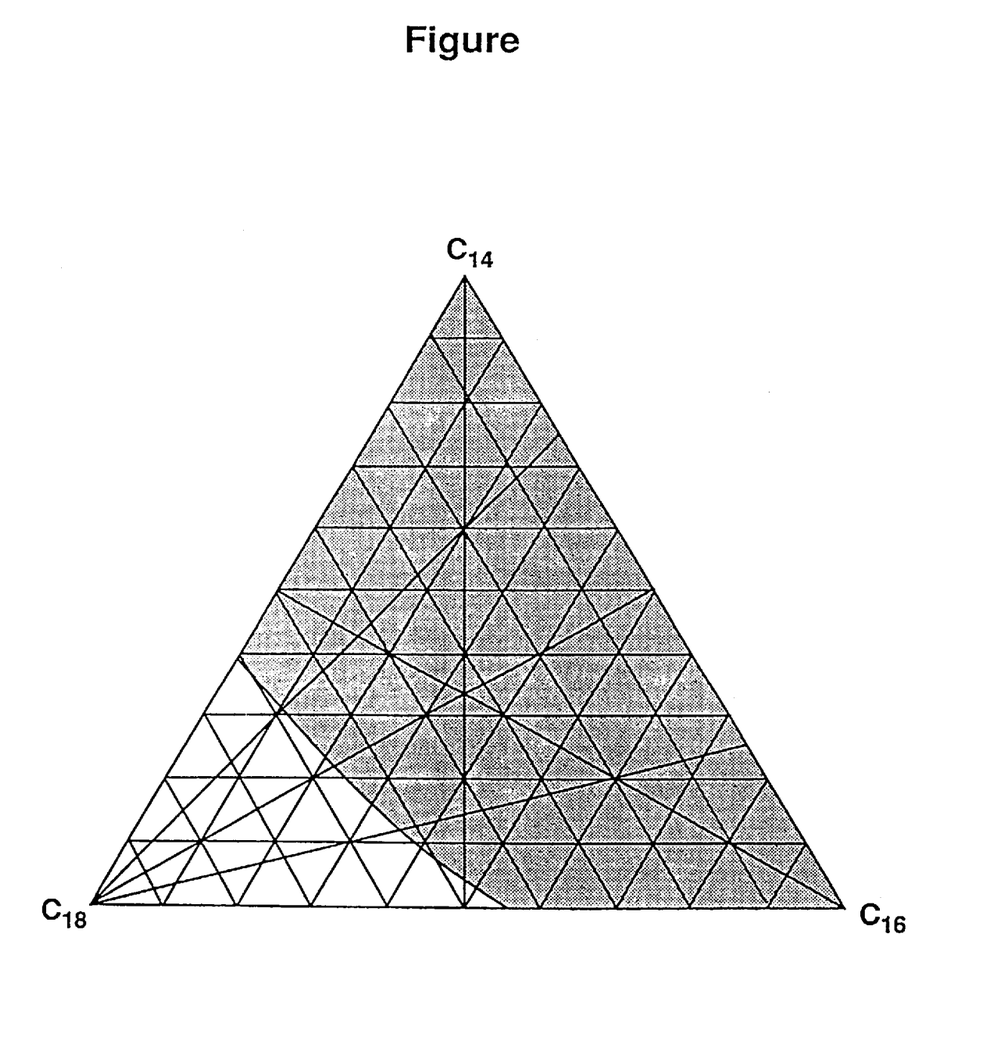
The Figure is a ternary diagram showing compositional mixtures, in terms of weight percent, for $C_{14}$, $C_{16}$ and $C_{18}$ isomerized normal alpha-olefins produced using the skeletal isomerization process of this invention. The shaded area shows compositions having properties, especially pour points, that are useful in drilling fluids.

Although the term "comprising" is generally used in this specification, it is intended that this term, as used herein, encompass and include the terms "consisting essentially of" and "consisting of".

Process for Preparing Isomerized Linear Olefins

In one embodiment, the present invention is a method of isomerizing an olefin feedstock to produce a synthetic hydrocarbon which is suitable for use as the continuous phase in a synthetic hydrocarbon-based drilling fluid. Preferably the process includes skeletal isomerization of the olefin feed. High product yields are achieved with little or no feed cracking.

In a preferred embodiment, the present invention is a process in which an olefin feed, preferably an NAO feed, is passed over a catalyst at near atmospheric pressure and in the absence of added hydrogen to isomerize both the double bond and rearrange the skeletal backbone of the starting olefin. We have unexpectedly discovered that partial skeletal isomerization leads to products that meet drilling fluid requirements. Moreover, since the hydrocarbons of this invention are synthetic materials, their molecular size and structure and hence their performance characteristics can be controlled and modified, for example as described hereinbelow.

The terms "isomerization", "isomerized", "skeletal isomerization" and "skeletally isomerized", as used herein, refer to hydrocarbon isomerization processes that include at least 5%, preferably greater than about 10%, and more preferably about 15% or more skeletal isomerization of the carbon backbone. Conversion of 1-butene to isobutene and conversion of 2-hexene to methylpentenes are examples of skeletal isomerization of a carbon backbone. Although double bond migration up and down the carbon chain generally occurs along with skeletal isomerization of the olefins, this is not encompassed by the term "isomerization" or in defining the amount of isomerization herein. For example, 30% skeletal isomerization of 1-decene gives a product mixture having 30% branched $C_{10}$ isomers, the remainder being linear (mostly internal) decene isomers. Hydroisomerization, that is, isomerization in the presence of hydrogen, is also encompassed by the term "isomerization".

Although skeletal isomerization of linear alpha-olefin is necessary to meet pour point and other specifications, it is not generally desirable to completely isomerize feed linear olefins. Complete skeletal isomerization can often only be achieved with excessively severe processing conditions, which result in excessive feed cracking and yield losses. Thus, partial skeletal isomerization is preferred; the degree of skeletal isomerization is preferably less than 90%, more preferably less than 80%, and most preferably less than 75%.

Some useful feeds for isomerization, such as commercially available alpha-olefins, often contain a few percent branched olefins (e.g., 2–10+percent) in the form of vinylidenes, which are alpha-olefins with an alkyl branch at the number two carbon. Skeletally isomerized olefin mixtures prepared from these feeds will include more branched products than just those produced by isomerizing the normal alpha-olefins. For purposes of this invention, all the branched compounds are counted as part of the mixture of isomerized products as they are indistinguishable from each other. However, when calculating the percent of isomerization, only the normal alpha-olefins which are skeletally isomerized are included.

A variety of catalysts can be used for skeletal isomerization. Preferred catalysts are molecular sieves having specific pore sizes and geometries. A preferred molecular sieve has generally oval, one-dimensional pores having a minor axis between about 4.2 Å and about 4.8 Å and a major axis between about 5.4 Å and about 7.0 Å. SAPO-11, SAPO-31, SAPO-41, SSZ-32, ZSM-22, ZSM-23 and ZSM-35 are examples of catalysts having this specific pore geometry. These catalysts are well known. For example, they are disclosed in U.S. Pat. No. 5,246,566 to Miller, which is incorporated herein by reference. Additionally, SSZ-32 is described in U.S. Pat. No. 5,252,527 to Zones. ZSM-23 is described in U.S. Pat. No. 4,076,842 to Plank et al. Preferred SAPO's include SAPO-11, SAPO-31, and SAPO-41, which are described in U.S. Pat. No. 4,440,871 to Lok et al. ZSM-22 is described in U.S. Pat. No. 4,556,477 and ZSM-35 is described in U.S. Pat. Nos. 4,016,245 and 4,107,195. The full disclosure of these patents is incorporated herein by reference.

Another useful molecular sieve is commonly known as a "non-zeolitic molecular sieve" abbreviated herein as "NZSM". These three-dimensional microporous crystalline structures contain $[AlO_2]$ and $[PO_2]$ oxide units. The NZMS may optionally contain silicon and/or one or more metals other than aluminum which will form oxide linkages in tetrahedral coordinates with aluminum and phosphorous in a crystalline framework. These NZMS's are well known: for example, aluminophosphates are described in U.S. Pat. No. 4,310,440; silicoaluminophosphate molecular sieves comprising tetrahedrally-coordinated $[AlO_2]$, $[PO_2]$ and $[SiO_2]$ structural units are described in U.S. Pat. Nos. 4,440,871, 4,943,424, and 5,087,347. Other useful NZMS's comprise $[MO_2]$, $[AlO_2]$ and $[PO_2]$ tetrahedrally-bound structural oxide units, where M represents at least one element which forms oxides in tetrahedral coordination with $[AlO_2]$ and $[PO_2]$ units. These are also well known: U.S. Pat. No. 4,567,029 describes NZMS's where M is selected from the group consisting of magnesium, manganese, zinc, and cobalt; U.S. Pat. No. 4,913,799 describes NZMS's where M is selected from the group consisting of arsenic, beryllium, boron, chromium, cobalt, gallium, germanium, iron, lithium, magnesium, manganese, silicon, titanium, vanadium, and zinc; and U.S. Pat. No. 4,973,785 describes NZMS's comprising tetrahedrally-bound structural units comprising $[M'O_2]$, $[SiO_2]$, $[AlO_2]$ and $[PO_2]$ oxide units, where M' represents an element which forms oxides in tetrahedral coordination with $[AlO_2]$ and $[PO_2]$ units, is characterized by a mean M'-O distance in tetrahedral oxide structures between about 1.51 and about 2.06 Å has a cation electronegativity between about 125 and about 310 kcal/g-atom, and is capable of forming stable M'-O-P, M'-O-Al or M'-O'-M' bonds in crystalline three dimensional oxide structures have an M'-O bond dissociation energy greater than about 59 kcal/mole at 289° C. The disclosures of each of the above-cited patents is incorporated herein by reference in their entirety.

Especially preferred isomerization catalysts are intermediate pore size silicoaluminophosphate molecular sieves, including, SAPO-11, SAPO-31, SAPO-41 and mixtures thereof. Preferred catalysts for preparing drilling fluids are described in U.S. Pat. No. 5,082,986 to Miller, which discloses SAPO isomerization catalysts having an intermediate pore size (5.3–6.5 Angstroms pore diameter) and at least one Group VIII metal. The full disclosure of this patent is incorporated herein by reference in its entirety. This patent discloses the use of these catalysts to produce $C_{20}$ and higher lubricating oils from olefins in the presence of added hydrogen at elevated pressures and elevated temperatures, for example, between 288° and 357° C. (see examples in patent).

We have now unexpectedly discovered that olefins can be isomerized by these catalysts at low temperatures and pressures, and even in the absence of added hydrogen. The degree of skeletal isomerization depends on process conditions. Indeed, products containing greater than 30%, greater than 40%, and even greater than 50% isomerized olefin can be readily obtained without substantial feed cracking. The resulting synthetic hydrocarbon product can be used directly in drilling fluids without the need for added purification steps, such as distillation.

The catalyst can be free of noble or transition metals, or it can contain at least one hydrogenation metal, preferably a Group VIII metal. Preferred Group VIII metals include platinum and palladium; platinum is especially preferred. The amount of metal, when present, typically ranges from 0.1 to 10%. For Group VIII metals, it is preferably from 0.3 to 2 wt % of the sieve.

In one preferred embodiment, the catalyst is an intermediate pore size molecular sieve as described above which is free of a metal hydrogenation component. This catalyst does not contain an added metal of the transition metal or noble metal groups, i.e., the catalyst is "free of metals" or "metal free". Indeed, we have surprisingly found that preferred silicoaluminophosphate catalysts which are free of noble metals have improved activity maintenance compared to a similar catalyst containing noble metals. Also, we have found that the molecular sieve alone has sufficient catalytic activity to produce the desired degree of isomerization, even at the relatively low temperatures preferred for this process. Moreover, it does not produce significant amounts of undesirable byproducts, e.g., oligomers such as dimers. Additionally, these metal-free catalysts cost less since they do not require added metals or the processing costs associated with metal addition, e.g. impregnation.

Skeletal isomerization can be readily conducted in a fixed bed low pressure reactor. However, other processing equipment known to those skilled in the art can be used. Reaction conditions depend on the degree of isomerization desired.

We have found that if the catalyst pellet size is large, for example, greater than ⅛ inch or even 1/16 inch, in diameter, the reaction rate may be reduced. In this instance, preferred reactor configurations can be selected. Thus, when using a fixed bed of relatively large catalyst pellets, such as ⅛ inch extrudates having a length of greater than about ¼ inch, e.g. ¾ inch, the process is preferably operated in a bed having a high linear flow velocity. This can be accomplished, for example, by having a length to diameter ratio greater than 10, more preferably greater than 20, and most preferably greater than 30. Alternatively, or in combination with the above, the catalyst bed can be packed with an inert solid material. A preferred inert material is sand.

Operating conditions are selected to achieve the degree of skeletal isomerization required to meet or exceed product specifications, generally pour point specifications. The reaction is exothermic, so there is a temperature profile in the reactor bed. With fresh metal free SAPO catalyst a reactor inlet temperature of about 110° C. is satisfactory to achieve sufficient conversion to make a hydrocarbon mixture that is useful as the continuous phase of drilling fluids. As the catalyst ages, the inlet temperature is raised. The low temperature associated with this process results in energy savings.

Preferred operating conditions, especially for making drilling fluids, are those which result in substantially no olefin cracking. By substantially no olefin cracking is meant very low yield loss—less than 10%, preferably less than 5% and more preferably less than 2% of the feed is cracked to products having fewer than 6 carbon atoms. In a preferred embodiment, >90%, preferably >95% and more preferably >98% of the product is within the boiling range of the olefin feed.

Drilling Fluids

For making drilling fluids, preferred operating conditions for the isomerization process using noble metal catalysts include weight hourly space velocities (WHSV's) between 0.5 and 10 at temperatures between 120° and 275° C. More preferred conditions include WHSV's of between 0.5–5 at temperatures of 160–260° C.; most preferred conditions include WHSV's of between 0.5–3 at temperatures of about 180–220° C. The lower temperatures result in substantial olefin double bond migration with limited skeletal isomerization, while the higher temperatures result in increased skeletal rearrangement.

Preferred operating conditions for metal-free SAPO catalysts include ambient pressure, temperatures of 100–200° C., and WHSV's of 0.5–5. More preferred operating conditions include temperatures of 100–180° C. and WHSV's of 0.5–3. Most preferred operating conditions include temperatures of 110–150° C. and WHSV's of 1–1.5. It is not necessary or preferred to add molecular hydrogen to the system. Indeed, the system is preferably operated at low pressure, for example, below 100 psig.

Synthetic hydrocarbons of this invention can be prepared by isomerization from any mixture of olefins (i.e., alpha or internal) having greater than 12, preferably between 12 and 24 carbon atoms. Preferred synthetic hydrocarbons of this invention are prepared by skeletally isomerizing commercial and readily available linear olefin feedstocks, preferably normal alpha-olefins.

The feed is preferably one or more olefins containing greater than 50%, more preferably, greater than 70% and most preferably greater than 90% linear olefins. An especially preferred feed is a normal alpha-olefin or a mixture of normal alpha-olefins. Both odd or even number olefins can be used. Although the feed may contain components of only one carbon number, it is preferred that it contain components of two or more different carbon numbers. Generally, each component has at least twelve carbon atoms. The feed preferably has components having between 12 and 24 carbon atoms, more preferably between 14 and 18 carbon atoms. The feed preferably contains less than 90% of $C_{18}$ or higher olefin, preferably less than 80%.

In an especially preferred embodiment of this invention, the resulting synthetic hydrocarbon is a mixture of olefins prepared by skeletally isomerizing a feed containing $C_{14}$, $C_{16}$, or $C_{18}$ NAO's or a mixture of these NAO's. Preferably, the isomerization is done using a SAPO-11 molecular sieve.

The skeletal isomerization process results in a product containing a mixture of branched olefins, along with a mixture of linear olefins. It is desirable to minimize hydrocarbon cracking during isomerization, so the product preferably has about the same carbon number as the feed. For instance, the synthetic hydrocarbon made by skeletally isomerizing a $C_{18}$ alpha-olefin contains primarily molecules that have a total of 18 carbon atoms. A preferred product is a mixture of both linear and branched olefins. Useful drilling fluids may comprise products derived from a single feed mixture, or a blend of products derived from a number of different feeds. The product linear olefins are mostly internal olefins, typically having less than 20% alpha-olefin, and preferably less than 10% alpha-olefin, more preferably less than 5 wt % and most preferably less than 2 wt %. We have found that less skeletal isomerization is needed (for example, to meet viscosity and pour point specifications) when the alpha-olefin content of the product is in these preferred ranges.

The skeletally isomerized olefins have one or more substituents, such as methyl, ethyl, propyl, or butyl, along the hydrocarbon chain; it is believed that most of these branched olefins have a single methyl substituent bound to an otherwise linear hydrocarbon chain. For example, the predominant branched product from $C_{16}$ alpha-olefin is a methyl-substituted pentadecene. Thus, these branched olefins are typically alpha- or internal olefins having one or more methyl substituents somewhere along the chain, although the mixture may contain a variety of branched products. Preferred compositions of this invention have at least 10 wt % branched (rather than linear), more preferably at least 15 wt % branched product. Preferably, between 15 and 90 wt % of the product is branched; more preferably between 20 and 70 wt %, and most preferably between 25 and 50 wt %. In general, it is not desirable to produce a completely branched product, such as one having greater than about 90% branched olefins, as this requires extreme (e.g., higher temperature) processing conditions which can result in feed cracking and yield loss.

Skeletally isomerized olefins are unique and novel products for drilling fluids. They are different from both mineral oils and from polyalpha-olefins. Mineral oils are paraffins, often containing a variety of cyclic products. In contrast, cyclic products are minimized in the skeletally isomerized olefins of this invention.

Polyalpha-olefins, on the other hand, are oligomerization products which are highly branched; PAO's contain more methyl groups per molecule. A typical commercial PAO dimer has an average of between 3.5 and 4 methyl groups per molecule, with higher oligomers having more methyl groups. In contrast, preferred skeletally isomerized olefins for drilling fluids contain both linear and branched hydrocarbons; on average there are less than three methyl groups per molecule, preferably less than 2.7.

Although discussed herein in terms of olefinic products, the synthetic hydrocarbons of this invention can be hydrogenated to achieve complete or preferably partial saturation. These hydrogenated products are also encompassed by the term "isomerized (linear) olefins" as used herein. However, the unhydrogenated hydrocarbons are preferred.

We have found the relative amount of each carbon number that can be used in the synthetic hydrocarbon mixture is dependent on the extent of isomerization. Higher carbon number olefins (e.g. $C_{20}$ to $C_{24}$) require more isomerization than $C_{14}$ to $C_{16}$ olefins. For example, to meet pour point specifications, $C_{18}$ NAO requires more isomerization than does $C_{16}$ NAO. Alternatively, an isomerized $C_{18}$ NAO that does not meet pour point requirements can be blended with isomerized $C_{16}$ and/or isomerized $C_{14}$ NAO to give a mixture with excellent pour point properties.

Depending on the composition of the various components, in some cases $C_{14}$ NAO can be blended with isomerized $C_{16}$ and/or isomerized $C_{18}$ product to produce olefin mixtures that are useful in drilling fluids.

Based on the description above, for a given set of process conditions a phase diagram showing acceptable product blends for the continuous phase of a drilling fluid can be constructed. The Figure shows regions of acceptable (shaded) and unacceptable blends. The components are isomerized $C_{14}$ or $C_{16}$ or $C_{18}$ mixtures having about 22% branched products and about 10% normal alpha-olefin. The components for this figure were prepared from NAO's; isomerization conditions were 200° C. and 1 WHSV using SAPO-11 catalyst containing Pt. For this figure, acceptable blends were defined as those that remained essentially clear and homogeneous after standing for two days at –10° C.

Isomerized Olefins in Downhole Fluids

One embodiment of the present invention is the use of skeletally isomerized olefins as a component of a downhole fluid used in subterranean wells. This mixture of olefins is useful in water-based drilling fluids and is especially useful as the synthetic hydrocarbon in the continuous phase of invert, or water-in-oil, emulsion type drilling fluids. Synthetic hydrocarbons used in downhole fluids, especially offshore, must have at least five properties. These are low pour point, low viscosity, acceptable flash point, lack of sheen, and minimal toxicity. Preferred isomerized olefins have these properties.

More particularly, the synthetic hydrocarbons preferably have a pour point below about 0° C. In offshore drilling, the drilling fluid may see the ambient ocean temperature in the riser, the section of pipe between the seabed and the drilling platform that is exposed to the ocean. Such temperatures can be close to 0° C. in the North Sea, for example, and the use of a synthetic hydrocarbon with a pour point higher than 0° C. may result in an unacceptable rise in the drilling fluid's viscosity, or even in severe thickening of the drilling fluid. Such phenomena can result in dispersal of the drilling fluid in the underground rock strata. More preferably, the synthetic hydrocarbon has a pour point below about –5° C. and remains homogenous after standing at –5° C. for at least one week. Most preferably the pour point is below about –9° C.

The derived viscosity of the drilling fluid is an important parameter since if it is too low, the drilling fluid will not perform its function of suspending the cuttings and bringing them to the surface; however, if it is too high, pumping of the drilling fluid will not be facile. While the derived kinematic viscosity of the drilling fluid can be controlled by additives, the viscosity of the synthetic hydrocarbon is a primary factor. For that reason, the kinematic viscosity of the synthetic hydrocarbon should be, broadly, in the range of 0.5 to 5 centistokes (cSt) at 100° C. More preferably, the kinematic viscosity at 100° C. is between 1 to 3 cSt, and, most preferably, is between 1.3 to 1.7 cSt.

A further requirement for the synthetic hydrocarbon is that it has a relatively high flash point for safety reasons. Preferably, the flash point should be above 90° C. A flash point above 110° C. is more preferred.

An additional requirement for the synthetic hydrocarbon is that it not produce a sheen when added to water. Unlike diesel fuels and other oils previously used in drilling fluid, the synthetic hydrocarbons of this invention produce no sheen and thus fulfill this requirement.

Additionally, the synthetic hydrocarbons of this invention are minimally toxic to marine and animal life. As invert emulsion drilling fluids, they exhibit minimal toxicity as determined by a Mysid shrimp (Mysidopsis bahia) bioassay specified by the United States Environmental Protection Agency (EPA). As shown in the examples herein below, drilling fluids prepared using the synthetic hydrocarbons of this invention are environmentally compatible.

The downhole fluid compositions of the present invention can be modified according to the end use of the fluid using suitable weight materials, emulsifiers, wetting agents, viscosifiers, densifiers, fluid-loss additives, and the like.

The synthetic hydrocarbons of this invention, as well as the higher molecular weight fluids discussed herein below, can also be used as workover fluids, packer fluids, coring fluids, completion fluids, and in other oil field and well-servicing applications. For example, they can be used as spotting fluids to unstick a drill pipe that has become stuck, or they can be used to replace part or all of the expensive polyalphaolefin lubricating additives in downhole applications. Additionally, they can also be used in drilling fluid formulations where shale-swelling inhibition is important, such as those described in U.S. Pat. No. 4,941,981 to Perricone et al.

These hydrocarbons are also very useful in water-based drilling muds. Thus in another aspect, the invention is a water-based drilling mud comprising a skeletally isomerized olefin mixture where the olefins have at least 12 carbon atoms, preferably between 12 and 24.

The downhole fluid comprises a mixture of internal linear and skeletally-isomerized methyl-substituted olefins as the synthetic hydrocarbon or nonaqueous phase. Although the synthetic hydrocarbon may comprise almost all of the volume of the downhole fluid, preferably, water is added.

For hydrocarbon-based drilling fluids the continuous hydrocarbon phase preferably comprises at least 30% by volume of the drilling fluid, more preferably between about 50 to 70 volume percent. Thus, the aqueous phase may comprise up to 70% by volume of the composition. The aqueous phase may be either fresh water or aqueous solutions containing salts such as sodium chloride, potassium chloride, calcium chloride, and combinations thereof. The salts function as a densifier and emulsion stabilizer, and also serve to protect salt formations from dissolution in the drilling fluid.

If the drilling fluid is formulated with a significant water content, the aqueous phase is preferably dispersed within the nonaqueous phase to form an invert emulsion. In the absence of mechanical agitation, such emulsions are generally unstable; so surfactants or emulsifiers are commonly added. Useful examples of surfactants include anionic surfactants such as the di- and trivalent metal salts of fatty acids; other useful surfactants are well known to those skilled in the art of drilling fluid formulation. The invert emulsion can be further stabilized by adding macromolecular surfactants. These include the polyamide class of emulsifiers manufactured by the reaction of polyamines with the combination of fatty acids and dibasic acids such as maleic and fumaric acids.

The density of the drilling fluid of the present invention can be adjusted by adding a weight material. It is often desirable to increase the drilling fluid density to prevent collapse of the formation into the bore-hole. Weight materials are well known in the art and include, but are not limited to: barium sulfate, calcium carbonate, iron oxide, and the like. To avoid the weight material settling out of high density drilling fluid compositions, it is often desirable to add a wetting agent. The emulsion stabilizing surfactants described above will serve this function also; however, other wetting agents can be added, if desired. These can include polyethoxylated alkylphenols, polyethoxylated alcohols, or polyethoxylated polyol fatty acid esters.

The suspending properties of the drilling fluid can be improved by adding a gellant or viscosifier. A commonly used viscosifier is an amine-treated clay. The clay will also impart some desirable filtration control properties.

If further fluid loss control is desired, other additives such as organophilic lignites, blown asphalt, uintaite or other polymeric materials that will line the bore-hole can be used.

Other hydrocarbons, such as those described in U.S. Pat. No. 5,096,883 and/or U.S. Pat. No. 5,189,012, may be blended with the synthetic hydrocarbon of this invention provided that the final blend has the necessary pour point, kinematic viscosity, flash point, and toxicity properties to function as the continuous phase of a synthetic hydrocarbon based drilling fluid. Additionally, the compositions may be modified by including various additives, such as those discussed above, to impart desirable properties to the drilling fluid. However, the omission of other specific additives in the discussion above is not intended to preclude their use in the drilling fluid of this invention.

Preferred drilling fluids of this invention have performance properties equivalent to or better than conventional oil-based drilling fluids. The synthetic hydrocarbon of this invention can be used to prepare an invert emulsion with excellent high temperature stability. Indeed, the drilling fluid of this invention exhibited better high temperature stability when compared to a drilling fluid prepared from a commercial 2 cSt polyalpha-olefin (PAO) synthetic hydrocarbon. Additionally, functional suspending properties of the products are indicated by the high yield points and acceptable gel strengths. Moreover, the fluid loss properties are good, even in the absence of a fluid loss additive.

Conventional oil-based drilling fluids exhibit substantial toxicity to marine life and therefore the cuttings from drilling operations with such fluids cannot currently be disposed of offshore, necessitating costly transport to shore and disposal in onshore hazardous waste facilities. In contrast, the drilling fluid of this invention exhibits minimal toxicity to marine life, as evidenced by the excellent survival rates of Mysid shrimp exposed to the drilling fluid in bioassays conducted according to the Protocol specified by the United States Environmental Protection Agency.

Moreover, the derived viscosity of the fluid was also lower, indicating that the drilling fluid of this invention offers a faster drilling fluid. The present inventors also contemplate that, alternatively, a drilling fluid of similar derived viscosity to that prepared using the commercial PAO could be prepared by using a lower synthetic hydrocarbon to water ratio, thus offering a more economical drilling fluid.

Furthermore, the synthetic hydrocarbons of the present invention can be manufactured by a process that offers considerable flexibility in choice of feedstock and operating conditions. Important properties of the synthetic hydrocarbon product that affect the final properties of the drilling fluid, such as kinematic viscosity and degree of branching, are controllable in this invention to an extent unavailable in practice to users of synthetic PAO's.

Additionally, since synthetic PAO's are in short supply, they are not always readily available. In part, this is because only a small fraction of the product resulting from oligomerization of 1-decene is useful in drilling fluids. In contrast, all of the product resulting from isomerization of the preferred feedstock, a mixture of 1-tetradecene, 1-hexadecene, and 1-octadecene, is useful as the continuous phase of synthetic hydrocarbon-based drilling fluids. The normal alpha-olefins—1-tetradecene, 1-hexadecene, and 1-octadecene—are commercially available products; for example, they can be purchased from Chevron Chemical Company, Houston, Tex.

Higher Molecular Weight Fluids/Lube Oils

Additionally, it has been found that the metal-free intermediate pore size molecular sieve catalysts described above, especially the SAPO catalysts such as SAPO-11, can also be used to skeletally isomerize $C_{20}$+olefins, and thereby significantly reduce the pour point of these hydrocarbons.

The resulting higher molecular weight isomerized olefins have a variety of uses including their use as spotting fluids for drilling wells, intermediates for chemicals, e.g., by derivatization into functionalized hydrocarbons, etc. They are especially useful as lube oils, because of their low pour point and high viscosity index. Additionally, they have desirably low toxicity to marine and other animal life, so they are particularly useful in oil field applications.

In one embodiment, the invention is a process for producing a hydrocarbon mixture useful as a lube oil, comprising isomerizing an olefin feed having at least 12 carbon atoms, preferably at least 20 carbon atoms, over a catalyst comprising an intermediate pore size molecular sieve which is substantially free of hydrogenation metals under conditions effective to reduce the pour point of the resulting oil to below −9° C., and optionally hydrogenating the thus produced synthetic hydrocarbon. After hydrogenation, which typically is a mild hydrofinishing step, the resulting lube oil product is highly paraffinic and has excellent lubricating properties. For lube oil use, the produced $C_{20}$+olefin product contains at least 10% skeletally isomerized olefin, preferably at least 50% and more preferably at least 90%.

For making lube oils, suitable olefins include normal internal olefins, normal alpha-olefins, branched olefins, polyalpha-olefins and combinations thereof. Preferably, the olefin employed is a $C_{20}$+olefin. Feeds such as dimers and trimers of normal alpha-olefins, typically having ten or more carbon atoms, preferably at least twelve carbon atoms, co-dimers, co-trimers and higher oligomers of normal alpha-olefins made from olefins having a single or multiple carbon numbers are also suitable. However, such feeds may have high viscosity indexes but have pour points too high to be useful for low temperature applications. Preferred feeds are normal alpha and internal olefins, as well as olefin dimers.

Isomerization conditions depend on the feed and the desired product pour point. For producing lube oils, the temperature generally is from about 200° C. to about 400° C., preferably from about 230° C. to about 320° C. The pressure is typically from about 15 psig to about 2000 psig, preferably from about 15 psig to about 1000 psig, more preferably from about 15 psig to about 600 psig. Hydrogen is a useful pressurizing gas. The liquid hourly space velocity (LHSV) is preferably from about 0.05 to about 20, more preferably from about 0.1 to about 5, most preferably from about 0.2 to about 2.0. Low pressure and low liquid hourly space velocity provide improved selectivity, thus resulting in more isomerization and less cracking of the feed and an increased yield.

The metal-free crystalline catalyst used in the isomerization step provides selective conversion of waxy feed components to non-waxy components. During processing, skeletal isomerization of the oil occurs to reduce its pour point below that of the feed and form a lube oil which has a low pour point and excellent viscosity index. The selectivity of the intermediate pore size molecular sieve used in the isomerization step reduces the yield of low boiling product made by cracking, thereby preserving the economic value of the feedstock.

It is often desirable to use mild hydrogenation referred to as hydrofinishing to produce more stable lube oils. Hydrofinishing is done after isomerization. Hydrofinishing is well known in the art and can be conducted at temperatures ranging from about 190° C. to about 340° C., at pressures of from about 400 psig to about 3000 psig, at space velocities (LHSV) of from about 0.1 to about 20, and hydrogen recycle rates of from about 400 to about 1500 SCF/bbl. The hydrogenation catalyst employed must be active enough to hydrogenate the olefins, diolefins and color bodies within the lube oil fractions. Preferably it also reduces the content of any aromatics present. The hydrofinishing step is beneficial in preparing an acceptably stable lubricating oil since unhydrofinished lubricant oils tend to be unstable in air and light and tend to form sludges.

The produced lube oil has a high viscosity index (VI) ranging from about 120 to about 180 and a very low pour point, generally below −9° C., preferably below −15° C. and for certain applications even below −40° C., a so called "ultra-low" pour point.

The lube oil produced by the process of the invention can be used in automobiles. It has a low viscosity for its boiling range which results in less frictional resistance, less engine wear and increased fuel efficiency. The low viscosity and low pour point of the lube oil result in improved cold engine starting. Additionally, little or no viscosity index improver or pour point depressant is needed with these lube oils; thus, fewer performance-decreasing deposits are formed. Also, the high paraffinic nature of the lube oil gives it high oxidation and thermal stability, and the lube oil has a high boiling range for its viscosity, i.e., volatility is low, resulting in low evaporative losses.

The produced lube oil can be used as a blending component with other oils. For example, the lube oil can be used as a blending component with polyalpha-olefins, or with mineral oils to improve the viscosity and viscosity index properties of those oils, or can be combined with isomerized petroleum wax.

EXAMPLES

The invention will be further described by the following examples. These examples are not intended to be limiting, in any way, the invention being defined solely by the appended claims.

In some of the following examples, reference is made to the degree of branching in the olefin product stream after passage over the isomerization catalyst. Information on the degree of branching was obtained by hydrogenating the olefin product mixture to paraffins using a carbon-supported nickel catalyst at 210° C. and 1000 psi of hydrogen. The mixture of linear and branched paraffins was then analyzed by gas chromatography (GC) using a HP Ultra-1 boiling point column. The linear paraffin was assumed to have originated from linear olefins and the other paraffins from branched olefins. GC analysis indicated that most of the branched compounds were methyl alkanes. The position of this methyl group on the main chain appeared random. The percent alpha-olefin present was obtained by $^{13}C$ NMR, unless otherwise indicated.

Standard procedures were used to measure drilling fluid properties. Kinematic viscosity was measured by ASTM Method D 445-4.

The standard ASTM test for pour point was found to be unsatisfactory for some of the olefin mixtures of this invention. Because of the variety of structures and carbon numbers in many of these mixtures, non-uniform results were obtained upon cooling. For example, some samples partially solidified on cooling, but nonetheless gave low pour point values as measured by the ASTM method. Therefore, for drilling fluid applications pour points were assessed using the following procedure. A sample was placed in a bath at −10° C. for at least two days. Samples that froze, precipitated solids, gelled, or turned turbid or hazy were judged to have pour points above −10° C. For these samples, cloud points were used in place of pour points. Cloud points were determined using ASTM method D 2500-88. Samples that could be poured and preferably were also transparent were deemed to have pour points of −10° C. or less and are generally safe for use at temperatures of −10° C. Additionally, in some instances an FTIR method was used to rapidly determine which samples would meet pour point specifications (see Example 13).

Example 1

Alpha-Olefin Isomerization

A mixture containing equal weights of commercially available 1-tetradecene, 1-hexadecene, and 1-octadecene from Chevron Chemical Company, Houston, Tex., was passed over a Pt-SAPO catalyst at 180° C. and a WHSV of 1.0. The catalyst was prepared in a manner similar to Example 1 of U.S. Pat. No. 5,082,956. The product mixture contained less than 5% alpha-olefin and about 24 wt % of the product mixture was branched. At 100° C., the product had a viscosity of 1.4 cSt, and its pour point was below −10° C. The skeletal composition of the product is shown in Table I.

TABLE I

| carbon # | % linear | % methyl branch | % other branch | % total branched |
|---|---|---|---|---|
| C14 | 77 | 20 | 3 | 23 |
| C16 | 76 | 21 | 3 | 24 |
| C18 | 75 | 22 | 3 | 25 |

Example 2

Alpha-Olefin Isomerization

A mixture of commercially available alpha-olefins was prepared. It contained 35% 1-tetradecene, 30% 1-hexadecene, 27% 1-octadecene, 4% 1-eicocene, 3% 1-dococene, and 1% 1-tetracocene. The mixture was passed over the catalyst of Example 1 at 180° C. and WHSV=0.58. The product mixture contained less than 5% alpha-olefin by $^{13}$C NMR, and about 35 wt% of the total product mixture was branched. At 100° C., the product had a viscosity of 1.6 cSt, and its pour point was below −10° C.

Example 3

Alpha-Olefin Isomerization

The procedure of Example 1 was repeated at 200° C. and a WHSV of 2.6. The product mixture contained less than 20% alpha-olefin by $^{13}$C NMR analysis, and about 25 wt % of the total product mixture was branched. Data on the degree of branching are shown in Table II. At 100° C., the product had a viscosity of less than 1.7 cSt, and its pour point was below −10° C.

TABLE II

| carbon # | % linear | % methyl branch | % other branch | % total branched |
|---|---|---|---|---|
| C14 | 76 | 20 | 4 | 24 |
| C16 | 74 | 22 | 3 | 26 |
| C18 | 74 | 23 | 3 | 26 |

Example 4

Alpha-Olefin Isomerization

The procedure of Example 1 was repeated at 200° C. and a WHSV of 0.58. The product mixture contained less than 10% alpha-olefin and about 44% (w/w) of the product mixture was branched. Most of the branching was due to a single methyl group randomly distributed on the hydrocarbon chain (see Table III). At 100° C., the product had a viscosity of less than 2 cSt, and its pour point was less than −10° C.

TABLE III

| carbon # | % linear | % methyl branch | % other branch | % total branched |
|---|---|---|---|---|
| C14 | 57 | 34 | 9 | 43 |
| C16 | 56 | 37 | 7 | 44 |
| C18 | 56 | 38 | 7 | 45 |

Example 5

Alpha-Olefin Isomerization

A mixture containing equal weights of commercially available 1-hexadecene and 1-octadecene was passed over the catalyst of Example 1 at 210° C. and a WHSV of 0.58. Less than 6% alpha-olefin remained in the product mixture which also had approximately 48% branching. Most of the branching was due to a single methyl group randomly distributed on the hydrocarbon chain (see Table IV). The olefin mixture had a viscosity of 1.6 cSt when measured at 100° C. The product remained a clear liquid when stored at −9° C. for 2 days.

TABLE IV

| carbon # | % linear | % methyl branch | % other branch | % total branched |
|---|---|---|---|---|
| C16 | 52 | 40 | 9 | 48 |
| C18 | 52 | 40 | 8 | 48 |

Example 6

Alpha-Olefin Isomerization

A mixture of commercially available alpha-olefins was prepared containing 37% 1-hexadecene, 34% 1-octadecene, 16% 1-eicocene, 10% 1-dococene, and 3% 1-tetracocene. The mixture was passed over the catalyst of Example 1 at 260° C. and a WHSV of 3. Data on the degree of branching are shown in Table V. The product mixture had a viscosity of 1.7 cSt at 100° C. and a pour point of −9° C.

TABLE V

| carbon # | % linear | % methyl branch | % other branch | % total branched |
|---|---|---|---|---|
| C16 | 31 | 53 | 17 | 69 |
| C18 | 34 | 53 | 14 | 67 |
| C20 | 37 | 55 | 9 | 63 |
| C22 | 38 | 57 | 6 | 63 |
| C24 | 36 | 65 | 0 | 65 |

Example 7

Linear-Olefin Isomerization

A mixture containing equal weights of tetradecene, hexadecene, and octadecene linear internal olefins was passed over the catalyst from Example 1 at 225° C. and a WHSV of 5. Data on the degree of branching are shown in Table VI. The pour point of the product dropped from −8° C. to −18° C. The kinematic viscosity of the product dropped from 1.4 cSt to 1.3 cSt at 100° C.

TABLE VI

| carbon # | % linear | % methyl branch | % other branch | % total branched |
|---|---|---|---|---|
| C14 | 79 | 21 | 1 | 21 |
| C16 | 79 | 22 | 0 | 22 |
| C18 | 77 | 23 | 0 | 23 |

Example 8

Preparation and Testing of a Drilling Fluid

The following Examples describe the preparation and testing of drilling fluids in the laboratory. The invert emulsions were prepared by mixing the other components into the base fluid using a Gifford Wood homogenizer. The ingredients were added in the order: viscosifier, lime, emulsifier, rheological modifier (if any), brine, and fluid loss additive (if any). The slurry was allowed to attain a temperature of 120° F. while mixing in the homogenizer. The slurry was then transferred to a conventional mixture and the barite added with stirring. Rheological properties of the resulting drilling fluid were determined at 120° F., initially, and after hot-rolling at the specified temperature, typically 150° F.

The product of Example 2 was formulated into a 70/30 hydrocarbon/water ratio, 12 lb/gal drilling fluid. Two compositions were prepared, with and without a fluid loss additive:

| Component | Fluid A | Fluid B |
|---|---|---|
| Product from Example 2 | 2250 ml | 2250 ml |
| Organoclay Viscosifier | 32 g | 32 g |
| Lime | 43 g | 43 g |
| Emulsifier | 86 g | 86 g |
| Rheological Modifier | 11 g | 11 g |
| 30% Calcium Chloride Brine | 832 ml | 832 ml |
| Barite | 2894 g | 2894 g |
| Fluid Loss Additive | 0 g | 65 g |

The drilling fluid compositions had the following rheological properties, measured at 120° F.

| Parameter | Fluid A | Fluid B |
|---|---|---|
| Fann Dial Reading @ 600 rpm | 62 | 64 |
| Fann Dial Reading @ 300 rpm | 41 | 43 |
| Fann Dial Reading @ 3 rpm | 6 | 7 |
| Plastic Viscosity, cps | 21 | 21 |
| Yield Point, lb/100 sq ft | 20 | 22 |
| 10 s gel strength, lb/100 sq ft | 8 | 7 |
| 10 m gel strength, lb/100 sq ft | 10 | 10 |

The drilling fluids were hot rolled at 150° F. for 16 hr and the rheological properties redetermined:

| Parameter | Fluid A | Fluid B |
|---|---|---|
| Fann Dial Reading @ 300 rpm | 33 | 34 |
| Fann Dial Reading @ 3 rpm | 7 | 8 |
| Plastic Viscosity, cps | 20 | 22 |
| Yield Point, lb/100 sq ft | 13 | 12 |
| 10 s gel strength, lb/100 sq ft | 10 | 11 |
| 10 m gel strength, lb/100 sq ft | 13 | 17 |
| Electrical Stability @ 120° F., V | 1150 | 1130 |
| PPT Test: 250° F., Grade 2 disk, 2500 psid | | |
| Spurt Loss, ml | 0.0 | 0.0 |
| Filtrate Volume, ml | 2.3 | 1.3 |
| PPT Value, ml | 4.6 | 2.6 |
| Filter Cake, 32 nd | 2 | 2 |
| HTHP filtrate @ 300° F., 500 psi | 8.6 | 7.5 |
| Cake Thickness, HTHP, 32 nd | 2 | 2 |
| PPT Test: 350° F., Grade 2 disk, 2500 psid | | |
| Spurt Loss, ml | 1.7 | 1.0 |
| Filtrate Volume, ml | 5.7 | 2.2 |
| PPT Value, ml | 13.1 | 5.4 |
| Filter Cake, 32 nd | 2 | 2 |

These data demonstrate that a stable invert emulsion drilling fluid can be prepared using an isomerized olefin mixture of this invention as the continuous phase.

Additionally, The formulation (fluid) without any fluid loss additive had good filtration properties at 300° F. and 350° F. Filtration control can easily be reduced by the addition of a fluid loss additive.

Example 9

Preparation and Testing of a Drilling Fluid

The product of Example 2 was formulated into a 70/30 oil/water ratio, 12 lb/gal drilling fluid. For comparative purposes, a drilling fluid was also prepared using a state of the art synthetic hydrocarbon, Synfluid® 2 cSt. Polyalphaolefin, available from Chevron Chemical Company, Houston, Tex.

| Component | Fluid C | Fluid D |
|---|---|---|
| Product from Example 2 | 2250 ml | |
| 2 cSt PAO | | 2250 ml |
| Organoclay Viscosifier | 54 g | 54 g |
| Lime | 65 g | 65 g |
| Emulsifier | 130 g | 130 g |
| 30% Calcium Chloride Brine | 832 ml | 832 ml |
| Barite | 2895 g | 2895 g |
| Fluid Loss Additive | 151 g | 151 g |

The drilling fluid compositions had the following rheological properties, measured at 120° F.

| Parameter | Fluid C | Fluid D |
|---|---|---|
| Fann Dial Reading @ 600 rpm | 70 | 121 |
| Fann Dial Reading @ 300 rpm | 40 | 71 |
| Fann Dial Reading @ 3 rpm | 4 | 9 |
| Plastic Viscosity, cps | 30 | 50 |
| Yield Point, lb/100 sq ft | 10 | 21 |
| 10 s gel strength, lb/100 sq ft | 5 | 9 |
| 10 m gel strength, lb/100 sq ft | 7 | 10 |

The drilling fluids were hot rolled at 300° F. for 12 hr and the rheological properties redetermined.

| Parameter | Fluid C | Fluid D |
|---|---|---|
| Fann Dial Reading @ 600 rpm | 72 | 102 |
| Fann Dial Reading @ 300 rpm | 41 | 58 |
| Fann Dial Reading @ 3 rpm | 5 | 4 |
| Plastic Viscosity, cps | 31 | 44 |
| Yield Point, lb/100 sq ft | 10 | 14 |
| 10 s gel strength, lb/100 sq ft | 5 | 4 |
| 10 m gel strength, lb/100 sq ft | 9 | 9 |
| HTHP filtrate @ 400° F., 500 psi | 9 | 8 |
| Cake Thickness, HTHP, 32 nd | 3 | 2 |
| Electrical Stability @ 120° F., V | 430 | 520 |

These data show that a drilling fluid formulated with the olefin mixture has better high temperature stability than a state of the art drilling fluid formulated with 2 cSt PAO. Overall, the high temperature stability of the emulsion was excellent. Additionally, Fluid C exhibited a lower viscosity which would be advantageous by providing a faster drilling type fluid.

Example 10

Preparation and Testing of a Drilling Fluid

The product of Example 4 was formulated into a drilling fluid of composition:

| | |
|---|---|
| Product from Example 4 | 2250 ml |
| Organoclay Viscosifier | 54 g |
| Lime | 65 g |
| Emulsifier | 130 g |
| 30% Calcium Chloride Brine | 832 ml |
| Barite | 2895 g |

The drilling fluid composition had the following Theological properties, measured at 120° F., before and after hot rolling at 150° F. for 16 hr.

| Parameter | Initial Value | Value After Aging |
|---|---|---|
| Fann Dial Reading @ 600 rpm | 46 | 53 |
| Fann Dial Reading @ 300 rpm | 27 | 30 |
| Fann Dial Reading @ 3 rpm | 4 | 5 |
| Plastic Viscosity, cps | 19 | 23 |
| Yield Point, lb/100 sq ft | 8 | 7 |
| 10 s gel strength, lb/100 sq ft | 6 | 6 |
| 10 m gel strength, lb/100 sq ft | 6 | 7 |
| Electrical Stability @ 120° F., V | 602 | 606 |

Example 11

Preparation and Testing of a Drilling Fluid

The product of Example 5 was formulated into a drilling fluid of composition:

| | |
|---|---|
| Product from Example 5 | 2250 ml |
| Organoclay Viscosifier | 54 g |
| Lime | 65 g |
| Emulsifier | 130 g |
| 30% Calcium Chloride Brine | 832 ml |
| Barite | 2895 g |

The drilling fluid composition had the following Theological properties, measured at 120° F., before and after hot rolling at 150° F. for 16 hr.

| Parameter | Initial Value | Value After Aging |
|---|---|---|
| Fann Dial Reading @ 600 rpm | 58 | 64 |
| Fann Dial Reading @ 300 rpm | 34 | 36 |
| Fann Dial Reading @ 3 rpm | 5 | 6 |
| Plastic Viscosity, cps | 24 | 28 |
| Yield Point, lb/100 sq ft | 10 | 8 |
| 10 s gel strength, lb/100 sq ft | 6 | 7 |
| 10 m gel strength, lb/100 sq ft | 8 | 8 |
| Electrical Stability @ 120° F., V | 554 | 589 |

Example 12

Toxicity Testing

The acute toxicity of the drilling fluids towards 4–6 day old Mysid shrimp (Mysidopsis bahia) was determined. Statistical analysis of the test results and calculation of a 96 hr $LC_{50}$ were performed using procedures recommended and approved by the US EPA. The $LC_{50}$ is the concentration of a test sample that produces 50% mortality in the test organisms and can be used as a measure of that sample's acute toxicity. Samples having an $LC_{50}$ of greater than 30,000 ppm is defined as a pass, i.e., these samples have minimal toxicity.

The bioassays were conducted using the suspended particulate phase (SPP) of the drilling fluid following the United States Environmental Protection Agency protocol in Appendix 3 of "Effluent Limitation Guidelines and New Source Performance Standards: Drilling Fluids Toxicity Test," Federal Register Vol. 50, No. 165, 34631–34636. The SPP is the unfiltered supernatant extracted from a stirred 1:9 mixture of the drilling fluid and sea water which has been allowed to settle 1 hr.

Initially, a 48 hr range finder test was performed with ten mysid shrimp being added to each of five concentrations (3%, 10%, 25%, 50%, and 100% SPP) and a sea water control, without replication. Based on the results of the range-finding test, the definitive 96 hr bioassay was initiated with test solutions of 3%, 10%, 25%, 50%, and 100% SPP for the sample. Twenty Mysids were added to each of the five concentrations of the test solution (SPP) and to the sea water control. Three replicates were used. Water quality parameters were measured and observations of test animals were made at 24 hr intervals. After 96 hr, the test was terminated.

The drilling fluid from Example 10 had an average $LC_{50}$ of 154,000 ppm and that from Example 11 had an average $LC_{50}$ of 377,000 ppm. These data demonstrate that these isomerized olefin mixtures are minimally toxic when used as the continuous phase for a synthetic hydrocarbon-based drilling fluid.

Example 13

FTIR Test for Pour Point

A Fourier Transform Infra-red (FTIR) procedure was developed and used to determine whether an olefin mixture, particularly a $C_{16}/C_{18}$ (1:1 by weight) olefin mixture, would pass the pour point specification for drilling fluids. This simple infra-red test was found to correlate well with the fluid's pour point.

The % alpha-olefin remaining in the isomerized product was measured by integrating three peak areas representative of olefin C-H bending absorbances. Using a baseline of about 1040 to 850 cm$^{-1}$, the region from 974 to 954 cm$^{-1}$ was integrated for calculating the % internal olefins, from 918 to 900 cm$^{-1}$ for alpha-olefins, and from 899 to 874 cm$^{-1}$ for trisubstituted olefins. The percent alpha-olefin was calculated as:

$$\% \text{ alpha- olefin} = \frac{100 \times (\text{alpha integral})}{(\text{sum of the three integrals})}.$$

The absorbance of the methyl group at 1378 cm$^{-1}$ is also measured using a baseline of about 1395 to 1325 cm$^{-1}$. For samples with low % alpha-olefin, the methyl absorbance is diagnostic for the amount of branching in the product mixture.

We have found that $C_{16}/C_{18}$ (1:1) samples having a pour point of <-10° C. need to have <10% alpha-olefin remaining and generally show a methyl absorbance per mm of path length of at least 10 when measured neat in a NaCl cell at 25° C.

Example 14

Alpha-Olefin Isomerization With a Metal-Free Catalyst

A mixture containing equal weights of commercially available 1-hexadecene and 1-octadecene was passed over a SAPO 11 catalyst that was not loaded with platinum. The catalyst pellets were ⅛ inch extrudate pellets about ¾ inch long. The isomerization was run at 150° C. and a WHSV of 1.5 in the absence of added hydrogen. The catalyst bed had a length to diameter ratio of 3.3, and was packed with sand to fill in void spaces between catalyst pellets.

The product had a viscosity of 1.47 cSt at 100° C., and its pour point was less than -10° C. The product mixture contained about 6% alpha-olefin by FTIR analysis and showed a methyl absorbance per mm of pathlength of 10.1.

To determine the type and location of branch points in the product mixture, the olefin product was hydrogenated. GC/FID analysis of hydrogenated product showed that 17% of the total product was branched. Also, 94% of the branched olefin product was mono-methyl substituted, while 6% was dimethyl substituted or other more highly branched olefin. Every possible $C_{16}$ and $C_{18}$ methyl paraffin was present in the hydrogenated product, indicating that methyl substituted olefins from 2 through 8 (or 9) were present in the unhydrogenated product mixture. About 3% of the total product was dimer.

Example 15

Alpha-Olefin Isomerization With a Metal-Free Catalyst

Commercially available 1-hexadecene was passed over the catalyst of Example 14 (no metal loading) at 140° C. and WHSV=1. The bed design was identical to that described in Example 14. The product mixture contained about 3% alpha-olefin by FTIR analysis, and about 20% (w/w) of the product mixture was branched. The product had a pour point less than -10° C.

Example 16

Alpha-Olefin Isomerization With a Metal-Free Catalyst

A mixture containing equal weights of commercially available 1-hexadecene and 1-octadecene was passed over the catalyst of Example 14 (no metal loading) at 150° C. and a WHSV of 1.5. The catalyst bed had a length to diameter ratio of 41.5 and did not contain an inert packing along with the ⅛ inch by ¾ inch extrudate catalyst pellets.

The product mixture contained about 3% alpha-olefin and showed a methyl absorbance per mm of pathlength of 10.2 by FTIR. GC/FID of hydrogenated product showed that 18% of the product mixture was branched. The branched product was 97% mono-methyl substituted olefin; 3% of the branched product was dimethyl or more highly substituted olefin. The pour point of the mixture was less than -10° C.

Example 17

Blending Isomerized Olefins

Samples of commercially available 1-hexadecene and 1-octadecene were isomerized separately under the conditions outlined in Example 15. The isomerized olefins contained 3–6% alpha-olefin and 20–23% branched products by FTIR. Greater than 95% of the branched products were mono-methyl substituted olefins (2 through 8 or 9 respectively). The pour point of the isomerized hexadecene was less than -10° C., while the pour point of the isomerized octadecene was greater than -10° C. Samples of the isomerized hexadecene and isomerized octadecene were then blended together in different ratios to determine a range of blends with pour points below -10° C. Blends that contained greater than 75% (w/w) isomerized octadecene had pour points greater than -10° C., while blends that contained 75% or less isomerized octadecene had pour points less than -10° C.

Example 18

A Drilling Mud Formulation

A synthetic hydrocarbon fluid was used in an invert drilling mud. The isomerized olefin used was prepared by reacting a 1:1 mixture of $C_{16}$ and $C_{18}$ NAO's over a SAPO 11 catalyst which was free of noble metals. Isomerization was done adiabatically at an inlet temperature of about 110° C. and at a WHSV of about 2 using a reactor similar to that of Example 16. The product had 15% branching and 2% residual NAO by FTIR. It had a pour point of less than -10° C., and a viscosity at 100° C. of 1.4 cSt. A mysid shrimp bioassay returned an $LC_{50}$ value of >1,000,000 ppm SPP. Its rheological properties were periodically monitored during use. The mud composition and rheological data were:

| Mud Composition (1 barrel = 42 gallons) | |
|---|---|
| $C_{16}/C_{18}$ Isomerized Olefins, bbl | 0.65 |
| 25% Brine, bbl | 0.23 |
| Viscosifier, lb | 6 |
| Lime, lb | 6 |
| Calcium Carbonate, lb | 20 |
| Emulsifier, gal | 1 |
| Barite, lb | 110 |

-continued

| Rheological Data (120° F.) | |
| --- | --- |
| Fann Dial Reading @ 600 rpm | 60 |
| Fann Dial Reading @ 300 rpm | 35 |
| Fann Dial Reading @ 3 rpm | 5 |
| Plastic Viscosity, cps | 25 |
| Yield Point, lb/100 sq ft | 10 |
| 10 sec Gel Strength, lb/100 sq ft | 7 |
| 10 min Gel Strength, lb/100 sq ft | 8 |

Drilling was done through approximately 4500 ft of active shale and depleted sands and was complete in about 6 days with an average drilling rate of 32 ft/hr. (For comparison it was estimated that it would have taken 18 days for drilling with a water-based mud). There were no sticking problems during operation, and the mud loss on the cuttings was very low. This test was very successful.

Example 19

Isomerization of 4 cSt $C_{14}$ PAO Over Metal-Free SAPO-11

A $C_{14}$ PAO feed comprising mostly dimer and having the following properties is isomerized using the catalyst described in U.S. Pat. No. 4,943,424, Example 1. The catalyst is a bound catalyst containing 15% Catapal alumina.

| Feed Properties | |
| --- | --- |
| Pour Pt, ° C., by ASTM Method | −26 |
| Cloud Pt, ° C. | −13 |
| Vis., 40° C., cSt | 17.62 |
| Vis., 100° C., cSt | 4.21 |
| VI | 150 |

Isomerization is conducted at a pressure of 600 psig, at 480° F. (250° C.) and at a LHSV of 0.3. The product has a pour point ≦−40° C. and a viscosity index (VI) ≧120.

What is claimed is:

1. A process for producing a synthetic hydrocarbon product, the process comprises contacting under isomerization conditions an olefin feed and a catalyst, wherein at least 50% of the olefin feed is comprised of linear olefins containing at least 12 carbon atoms, and wherein the catalyst consists of either a zeolitic molecular sieve with oval, one-dimensional pores having a minor axis between about 4.2 A and about 4.8 A and a major axis between about 5.4 A and about 7.0 A or a non-zeolitic molecular sieve with a non-aluminum metal which forms oxide linkages in tetrahedral coordinates with aluminum and phosphorous in a crystalline framework, and wherein the catalyst is free of noble or transition metals, and wherein the isomerization conditions are such that there is at least 5 weight % skeletal isomerization of the carbon backbone and the isomerization conditions include a temperature in the range of from 100° C. and 200° C., and wherein the product comprises a mixture of branched olefins and linear olefins.

2. The process of claim 1 wherein the isomerization conditions are such that there is at least 10 weight % skeletal isomerization of the carbon backbone.

3. The process of claim 2 wherein the isomerization conditions are such that there is at least 15 weight % skeletal isomerization of the carbon backbone.

4. The process of claim 1 wherein the olefin feed comprises alpha-olefins.

5. The process of claim 4 wherein the olefin feed comprises greater than 50 weight % linear olefins.

6. The process of claim 5 wherein the olefin feed comprises greater than 70 weight % linear olefins.

7. The process of claim 6 wherein the olefin feed comprises greater than 90 weight % linear olefins.

8. The process of claim 5 wherein the product comprises less than 20 weight % alpha-olefin.

9. The process of claim 8 wherein the product comprises less than 10 weight % alpha-olefin.

10. The process of claim 9 wherein the product comprises less than 5 weight % alpha-olefin.

11. The process of claim 5 wherein the branched olefins comprise olefins having one or more methyl substituents.

12. The process of claim 8 wherein the isomerization conditions are such that the product exhibits a pour point of below about 0° C.

13. The process of claim 12 wherein the isomerization conditions are such that the product exhibits a pour point of below about −5° C.

14. The process of claim 13 wherein the isomerization conditions are such that the product exhibits a pour point of below about −9° C.

15. The process of claim 1 wherein the catalyst is a silicoaluminophosphate composition.

16. The process of claim 15 wherein the catalyst is SAPO-11, SAPO-31, SAPO-41 or mixtures thereof.

* * * * *